United States Patent [19]

Verwer et al.

[11] Patent Number: 4,499,235
[45] Date of Patent: Feb. 12, 1985

[54] POLYESTER IN-MOULD COATING POWDER

[75] Inventors: Andreas N. J. Verwer, Beek; Johannes T. M. Evers, Maarn, both of Netherlands

[73] Assignee: DSM Resins B.V., Zwolle, Netherlands

[21] Appl. No.: 534,244

[22] Filed: Sep. 21, 1983

[30] Foreign Application Priority Data

Oct. 8, 1982 [NL] Netherlands .......................... 8203904

[51] Int. Cl.³ ...................... C08G 63/76; C08L 67/00
[52] U.S. Cl. ..................................... 525/38; 264/255; 264/308; 264/331.18; 264/331.21; 427/133; 525/44; 525/46; 528/303
[58] Field of Search .................. 528/303; 525/38, 44, 525/46; 264/255, 308, 331.18, 331.21

[56] References Cited

U.S. PATENT DOCUMENTS

| | | | |
|---|---|---|---|
| 2,806,014 | 9/1957 | Beavers et al. | 525/27 X |
| 3,801,693 | 4/1974 | Stallings et al. | 264/331.18 X |
| 3,966,870 | 6/1976 | Vecchiotti | 264/255 |
| 4,205,028 | 5/1980 | Brueggemann | 264/24 |
| 4,228,113 | 10/1980 | Van Gasse | 264/24 |
| 4,251,641 | 2/1981 | Arakawa et al. | 525/34 X |
| 4,276,388 | 6/1981 | Iwami et al. | 528/303 X |
| 4,287,310 | 9/1981 | Van Gasse | 525/44 |
| 4,290,938 | 9/1981 | Miyake | 523/527 |
| 4,316,869 | 2/1982 | Van Gasse | 264/255 |

FOREIGN PATENT DOCUMENTS 1387549 2/1972 United Kingdom .

OTHER PUBLICATIONS

80 Chem. Abstr., No. 10, Abstr. No. 493910.

Primary Examiner—Lucille M. Phynes
Attorney, Agent, or Firm—Cushman, Darby & Cushman

[57] ABSTRACT

Powdery coating agent, suitable for application in the in-mould coating technique, comprising as the main component, besides a curing catalyst and if desired other additives, a crystalline unsaturated polyester with a melting point of at least 40° C., a degree of unsaturation of between 1 and 5 moles unsaturation per 1000 g polyester and a viscosity in the melt at 120° C. of at least 1 dPa.s.

16 Claims, No Drawings

POLYESTER IN-MOULD COATING POWDER

The invention relates to a powder that can be used to apply a coating to an object with the in-mould coating process and to the use of the powder.

This process and powders suitable to be used in this process are described in U.S. Pat. No. 4,228,113 and U.S. Pat. No. 4,205,028. The powder is required to be stable in storage without clotting. Moreover, after its application to the hot wall of the mould, it must flow out well and harden quickly. Furthermore, the coating formed must come up to high standards.

The disadvantage of the known powders to be used in in-mould coating is that it is impossible with these powders to meet all requirements in full. In particular it is difficult to guarantee the storage stability of the powder at a temperature of above 20° C.

The object of the invention is to improve the properties of the powder.

In a powdery coating agent suitable for use in the in-mould coating technique, which coating agent has an unsaturated polyester resin as essential bonding agent and, furthermore, a curing catalyst and, if so desired, other additives, the main component of the bonding agent consists, according to the invention, of a crystalline unsaturated polyester with a melting point of at least 40° C., a degree of unsaturation of between 1 and 5 moles/1000 g polyester and a viscosity in the melt at 120° C. of at least 1 dPa.s It has been found that by using crystalline unsaturated polyesters powders can be obtained having an increased storage stability. In the powder no other or only minimum quantities of other curable components need be incorporated in order to come to coatings having good physical properties.

At room temperature almost all unsaturated polyesters which, for application in coatings, are used as moulding compounds or bonding agents, are amorphous solids which yet show a certain degree of stickiness, however. They do not have a sharp melting point, but a softening range. Crystalline unsaturated polyesters are known. Their application range is very limited, particularly owing to the poor solubility in styrene. In literature the use of mixtures of a crystalline and an amorphous polyester is often described, for instance in moulding compounds as bonding agent or impregnating resin.

However, when used in powder for in-mould coating definite advantages present themselves. Thus such a powder based on a crystalline polyester shows no clotting tendency when stored at room temperature and continues to be free-flowing. These favourable properties are retained also if a limited quantity of one or more other unsaturated components has been mixed into the powder. This makes it possible to influence the properties of the cured coating. The fact that the polyester has a sharp melting point may also be an advantage in the preparation of the powder. A crystalline unsaturated polyester is defined here as an unsaturated polyester showing a melting point to be determined by the capillary method (including also a melting range covering less than 5° C.), with the polymer changing from non-transparent into transparent.

The polyesters to be used in the invention must show a melting point of between 40° C. and 175° C. The melting point is preferably above 50° C., more particularly above 70° C. The maximum permissible melting point depends on the temperature at which the powder will be used. Preference is given to using a polyester having a melting point about 25° C. below the processing temperature. The processing temperature may be between 75° C. and 200° C. and is in most cases between 100° C. and 160° C.

The melting points mentioned here and in the examples have been determined by the DTA method at a heating rate of 7.5° C./minute. The crystalline unsaturated polyester must have an unsaturation of between 1 and 5 moles double bonds per 1000 g polyester. The best results as far as curing rate and coating properties are concerned are obtained if the polyester has a degree of unsaturation of between 2.0 and 3.75 moles/1000 g polyester. The viscosity of the crystalline unsaturated polyester in the melt at 120° C. is to be regarded as an indication of the molecular weight and of the flow of the powder in the processing. The polyester must have a viscosity at 120° C. of at least 1 dPa.s, preferably of at least 15 dPa.s and more specifically of at least 30 dPa.s. Generally the viscosity will not be above 200 dPa.s. The viscosity of higher-melting polyesters is measured at a temperature 1° to 5° C. above the melting point.

The crystalline unsaturated polyester can be made in a manner known in the art by condensation, whether or not in the presence of a catalyst, of an unsaturated dicarboxylic acid and a diol, usually in addition also to a saturated or aromatic dicarboxylic acid and possibly small quantities of monofunctional carboxylic acid or alcohol. As unsaturated dicarboxylic acid, fumaric acid is used, rather than maleic acid or the anhydride thereof. As saturated or aromatic dicarboxylic acids, compounds having a centre of symmetry are used, such as oxalic acid, succinic acid, adipic acid, suberic acid or terephthalic acid. The diols used are also compounds having a centre of symmetry, such as ethyleneglycol, 1,4-butanediol and 1,6,-hexanediol or the unsaturated 2,-butenediol (1,4). Diols containing an ether bond are preferably not used as principal monomer. Furthermore, minor quantities of monocarboxylic acid, tricarboxylic acid, mono-alcohol or triol can be used for the purpose of reaching special effects, provided it involves no or only little disturbance of the crystallinity. Examples include abietinic acid, methacrylic acid, benzoic acid, benzylalcohol, etc. The total quantity of these modifiers remains below 20% (wt) and preferably below 10% (wt) calculated in respect of the sum of the components. Halogenated diols and/or halogenated (di)carboxylic acids can likewise be incorporated in the crystalline polyester in order to give the coating eventually obtained a certain resistance against fire. The crystalline polyester preferably consists for at least 80% (wt) of units from the group of fumaric acid, symmetric aliphatic $C_{2-12}$ dicarboxylic acids and symmetric $C_{2-12}$ aliphatic diols.

The powder according to the invention consists of one or more (co)polymerizable unsaturated components, which jointly form the bonding agent, a curing system for the bonding agent and, if so desired, other non-copolymerizable components such as release agents, flow agents, pigments, fillers, stabilizers, etc. The bonding agent consists wholly or mainly of one or more crystalline unsaturated polyesters. The proportion of these polyesters is at least 60% (wt) and preferably at least 70% (wt) and more in particular at least 85% (wt). In addition high-boiling (co)polymerizable monomers, prepolymers or polymers may form part of the bonding agent. The monomers must have a boiling point of at least 25° C. above the temperature at which the powder is applied and preferably of above 200° C. The quantity of monomers to be used is preferably less than 15% (wt), particularly less than 7% (wt), calculated in respect of the quantity of bonding agent. The purpose for which such monomers are used is in most cases to increase the degree of cross-linking. Suitable are, for instance, triallylcyanurate, triallylisocyanurate, trimethylolpropanetriacrylate and triallyltrimellitate. An amorphous unsaturated polyester can also be incorporated in the bonding agent, for instance to increase the impact resistance. Furthermore, polymers having a low molecular weight or oligomers or prepolymers can be incorporated in the bonding agent, for instance a diallylphthalate prepolymer. Generally, such additional compounds will be used only if they are required to improve the properties of the coating and in so far as they do not influence the properties of the powder adversely.

The coating powder contains a catalyst for the curing of the unsaturated compounds. Particularly peroxides are used, such as, for instance, hydroperoxides, ketoneperoxides and peresters. The quantity of catalyst mostly amounts to between 0.5 and 5% (wt) calculated in respect to the unsaturated components. In addition a conventional accelerator may be present, for instance a cobalt compound or a solid amine. The various component parts of the powder can be ground, separately or mixed together in two or more premixes, to the required particle size and the powders can then be mixed, or all components can also be mixed together at a temperature at which all organic compounds are liquid. Further particulars are mentioned in, inter alia U.S. Pat. No. 4,287,310 and U.S. Pat. No. 4,228,113. When mixing at elevated temperature in the presence of a peroxide, there may already be a certain degree of polymerization. Such coating powders the components of which have already been subject to a slight copolymerization also come within the scope of the invention. The grain size of the powder is generally between 0.01 and 0.20 mm and preferably between 0.03 and 0.08 mm.

The powder is applied to the wall or walls of a mould, which have a temperature of between 75° C. and 200° C. and preferably between 100° C. and 160° C. The powder melts and forms a continuous layer. The polymer is allowed to cure to such an extent that the layer can withstand some mechanical load but is not yet cured completely and thoroughly, in such a manner that good adhesion with the polyester moulding compound is obtained. The powder is applied preferably by electrostatic spraying. The coating eventually obtained is generally between 0.05 and 0.8 mm thick. In the half-mould process the object is obtained by subsequently building up the walls of the object on the coating by applying, in a plurality of cycles, unsaturated polyester and glassfibre, whether mixed or not, and allowing them to cure. The wall of the mould provided with the coating may form part also of a mould in which objects are made from polyesters at elevated temperature and pressure via the SMC or BMC moulding techniques or by injection moulding.

EXAMPLE 1

In a reactor provided with a stirrer 1740 parts by weight fumaric acid, 438 parts adipic acid and 1800 parts 1,4 butanediol were mixed with each other and heated, under exclusion of oxygen, to 210° C. The reaction was continued until the reaction mixture had a viscosity of 56 dPa.s (at 120° C. measured with the Nouri v.d. Lande falling ball method) and an acid number of 20 mg KOH/100 g polyester. The resulting resin has a degree of unsaturation of 3.9 moles/1000 g polyester and a melting point of 120° C. (DTA method).

EXAMPLE 2

A powder suitable for use in in-mould-coating was prepared by mixing the following components in the melt in parts by weight: 96 parts crystalline polyester from example I, 4 parts triallylcyanurate, 2 parts t.butylperbenzoate, 0.4 parts cobaltoctoate, 2 parts zincstearate, 2.5 parts silica and 5 parts inorganic brown pigment. The mixing was effected at 125° C. in a mixing extruder, in which process the peroxide was metered just before the discharge aperture. The homogeneous mass was cooled on a cooling roll and processed to form chips, which were subsequently ground to form a powder with a diameter of about 0.05 mm. The powder could be used successfully in the manufacture of wall elements provided with an excellently adhering brown coating, with the technique described in U.S. Pat. No. 4,287,310. The powder could be stored without objection for at least a month at 20° C.

EXAMPLES III

In the manner described in example I a number of crystalline unsaturated polyesters were prepared. The monomers used, and their quantities, in gmoles, are given in the table, as well as the properties of the resulting products.

TABLE

| Example | III | IV | V | VI | VII | VIII |
| --- | --- | --- | --- | --- | --- | --- |
| phthalic acid anhydride | — | 2 | — | — | — | — |
| succinic acid | 3 | — | — | — | 3 | 3 |
| adipic acid | 3 | 4 | 9 | 3 | 3 | 3 |
| fumaric acid | 12 | 13 | 9 | 15 | 12 | 12 |
| 1,4 butanediol | 20 | 20 | 20 | 18 | 18 | — |
| 1,2 propanediol | — | — | — | — | 2 | — |
| diethyleneglycol | — | — | — | 2 | — | — |
| 1,6 hexanediol | — | — | — | — | — | 20 |
| melting point °C. | 118,5 | 104,0 | 81,0 | 88 | 89 | 75 |
| viscosity at 120° C. (dPa.s) | 92 | 23 | 49 | 60 | 29 | 100 |
| degree of unsaturation (mole/1000 g) | 3,5 | 3,6 | 2,5 | 4,4 | 3,6 | 3,3 |

We claim:

1. In a powdered coating agent, suitable for application in the in-mould coating techinque, composed of a bonding agent comprising an unsaturated polyester resin, a curing catalyst and other additives, the improvement consisting essentially of a bonding agent composed of at least 85% by weight of a crystalline polyester, said crystalline polyester composed of at least 80% by weight of (i) a symmetric unsaturated dicarboxylic acid, a symmetric saturated dicarboxylic acid and an aromatic dicarboxylic acid and (ii) a symmetric aliphatic diol, said bonding agent having a melting point of at least 40° C., a degree of unsaturation of between 1 and 5 moles unsaturation per 1000 grams of said polyester and a viscosity in the melt at 120° C. of at least 1 dPa.s.

2. Coating agent according to claim 1, characterized in that the crystalline polyester has a melting point of at least 50° C.

3. Coating agent according to claim 1, characterized in that the crystalline polyester has a melting point of at least 70° C.

4. Coating agent according to claim 1, characterized in that the crystalline polyester has a degree of unsaturation of between 2.0 and 3.75 moles/1000 g.

5. Coating agent according to claim 1, characterized in that the crystalline polyester has a viscosity in the melt at 120° C. of at least 15 dPa.s.

6. Coating agent according to claim 1, wherein said symmetric unsaturated dicarboxylic acid is fumaric acid.

7. Coating agent according to claim 1, wherein said symmetric unsaturated dicarboxylic acid and said aromatic dicarboxylic acid contain 2 to 12 carbon atoms.

8. A coating agent according to claim 7, wherein said aromatic dicarboxylic acid is terephtalic acid.

9. Process for preparing a polyester based and cured object composed of an unsaturated polyester with fillers and/or reinforcing materials in or on a mould, wherein said process the interior surface of said mould is first coated over the entire surface area or a part thereof at a temperature between 75° C. and 200° C. with a polyester-based thermosetting coating powder which subsequently flows out and cures to form a coating on said surface upon which coating said polyester based object is moulded, wherein said process said coating powder is a powder composed of an unsaturated polyester resin bonding agent, a curing catalyst and other additives, said bonding agent consisting essentially of at least 85% by weight of a crystalline polyester composed of at least 80% by weight of (i) a symmetric unsaturated dicarboxylic acid, a symmetric saturated dicarboxylic acid and an aromatic dicarboxylic acid and (ii) a symmetric aliphatic diol, said bonding agent having (a) a melting point of at least 40° C., (b) a degree of unsaturation of between 1 and 5 moles unsaturation per 1000 grams polyester and
(c) a viscosity in the melt at 120° C. of at least 1 dPa.s.

10. Process according to claim 9, wherein said crystalline polyester has a melting point of at least 50° C.

11. Process according to claim 9, wherein said crystalline polyester has a melting point of at least 70° C.

12. Process according to claim 9, wherein said crystalline polyester has a degree of unsaturation of between 2.0 and 3.75 moles/1000 g.

13. Process according to claim 9, wherein said crystalline polyester has a viscosity in the melt at 120° C. of at least 15 dPa.s.

14. Process according to claim 9, wherein said crystalline polyester is composed of at least 80% by weight of units derived from fumaric acid, symmetric aliphatic dicarboxylic acids containing 2 to 12 carbon atoms, and symmetric aliphatic diols containing from 2 to 12 carbon atoms.

15. Process according to claim 9, wherein said coating agent includes polymerizable components consisting of at least 85% by weight of one or more crystalline unsaturated polyesters having a melting point of at least 70° C., a degree of unsaturation of between 2.0 and 3.75/1000 g and a viscosity in the melt at 120° C. of at least 15 dPa.s.

16. Process according to claim 15, wherein said crystalline polyester is composed of at least 80% by weight of units derived from fumaric acid, symmetric aliphatic dicarboxylic acids containing 2 to 12 carbon atoms and symmetric aliphatic diols containing from 2 to 12 carbon atoms.

* * * * *